United States Patent [19]

Bartholomew

[11] Patent Number: 5,207,462
[45] Date of Patent: May 4, 1993

[54] APPARATUS AND METHOD FOR A PUSH ASSEMBLE RETAINING RING

[75] Inventor: Donald D. Bartholomew, Mt. Clemens, Mich.

[73] Assignee: Proprietary Technology, Inc., Southfield, Mich.

[21] Appl. No.: 608,551

[22] Filed: Nov. 2, 1990

[51] Int. Cl.$^5$ .............................................. F16L 37/14
[52] U.S. Cl. ..................... 285/321; 285/921; 403/326
[58] Field of Search ................ 285/321, 921; 411/353, 411/352, 522, 946, 518; 403/326, 329, 377, 108

[56] References Cited

U.S. PATENT DOCUMENTS

| | | | |
|---|---|---|---|
| 2,950,132 | 8/1960 | Kocsuta | 411/518 X |
| 3,948,548 | 4/1976 | Voss | 285/321 |
| 4,007,953 | 2/1977 | Powell | 285/321 |
| 4,043,685 | 8/1977 | Hyams | 403/326 X |
| 4,226,445 | 10/1980 | Kramer | 285/321 X |
| 4,352,586 | 10/1982 | Hayden | 403/377 X |
| 4,640,534 | 2/1987 | Hoskins et al. | 285/321 X |
| 4,951,550 | 8/1990 | Ohki et al. | 403/326 X |

Primary Examiner—Peter M. Cuomo
Attorney, Agent, or Firm—Harness, Dickey & Pierce

[57] ABSTRACT

An apparatus and a method is disclosed for configuring a spring arm retaining ring which is contained by a groove that is put into a bore, such that the concentricity of the ring to a male part which is installed into the bore is limited to an extent that allows the ring to enter a tapered bore leading to the ring bore, and compresses the outside diameter of the ring. The male part that is installed into the bore includes a configuration which cooperates with the retaining ring, and may or may not be a portion of the part, or assembled to the part. The combination of the ring disclosed and the cooperating portion allows a retaining ring to be installed by pushing the male part, that is to be retained in the bore, into the bore.

25 Claims, 4 Drawing Sheets

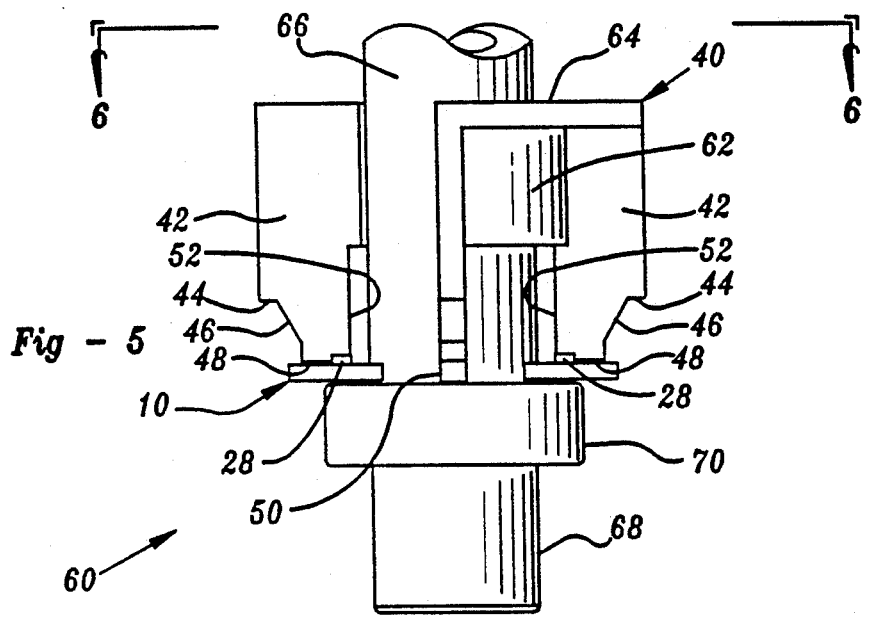
Fig - 5
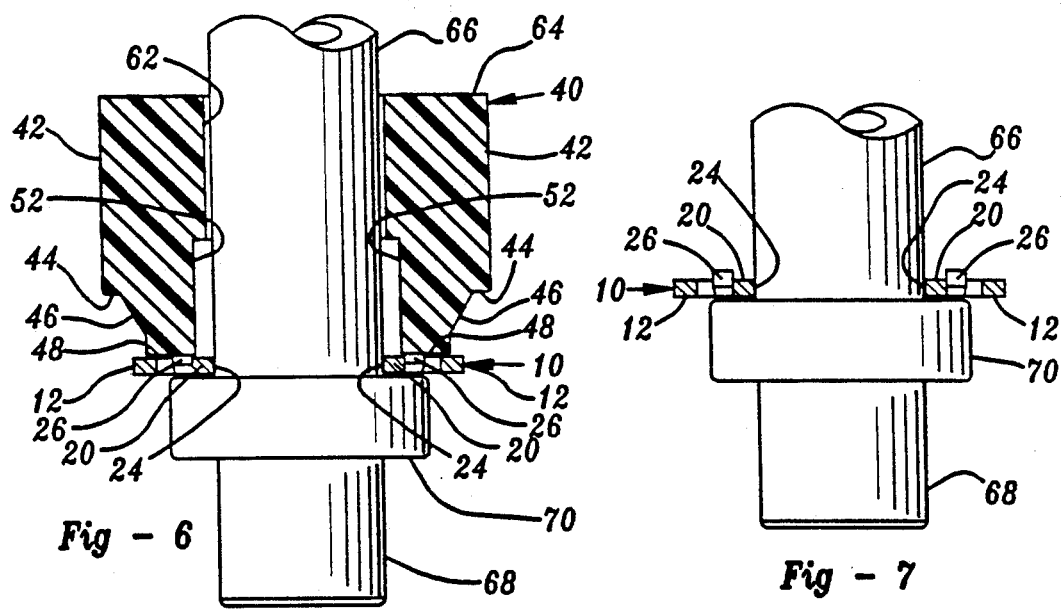
Fig - 6
Fig - 7
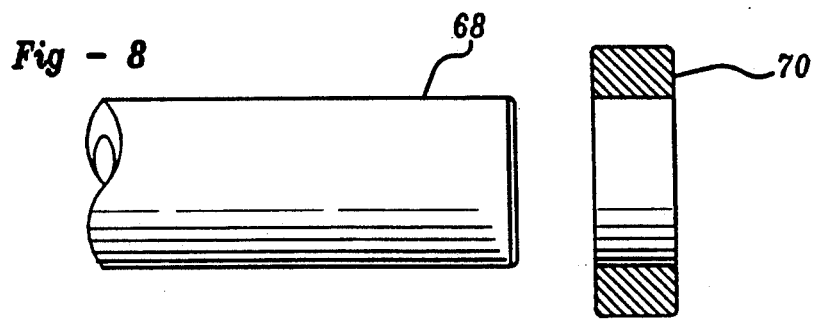
Fig - 8

APPARATUS AND METHOD FOR A PUSH ASSEMBLE RETAINING RING

BACKGROUND OF THE INVENTION

Rings that are compressed diametrically inward to facilitate the ring entering a female bore provided with a groove, of larger diameter than the bore, that has been provided in the bore to retain the ring when the ring was positioned so that the ring could expand into the groove, have been used for years.

These "internal retaining" rings are provided with two holes near the gap in the ring (that allows compression of the ring)-so that two prongs of a pliers like tool may engage the two holes and facilitate diametric compression of the ring for assembly or removal of the ring from the bore groove.

This invention concerns the use of provisions that are a part of the ring that cooperate with provisions that are associated with the male part that is to be retained in a bore by the ring, which allow the part to be merely pushed into the bore and retained by the ring in the bore. The pliers that are normally required are then only required for the removal of the male part from the female bore.

For the circumstances that can utilize this type of configuration, a considerable cost savings is thus obtainable. This savings more than offsets the added cost of providing the means herein disclosed, and there is a general improvement in the reliability that is associated with the installation of internal retaining rings.

When using the configuration disclosed herein, the diametric compression of the ring is accomplished by forcing the ring into a tapered bore that leads to the bore that is provided with the ring groove.

The recognition that a small angle chamfer will cause a ring to be squeezed to this extent is not new either. People who use these internal retaining rings do not normally use a chamfer to squeeze the rings because that is not reliable, or the cost to them of doing so is too great because of the length or depth of the chamfer is large, and the cost of the space is too great. The usual problem that one faces includes the concentricity of the ring. It does not seem like a large number that is involved but the ring must be allowed enough clearance to anything that passes through the ring to permit squeezing the ring enough to enter the bore. This of course requires that the ring can have a concentricity that would require a large entry diameter of the chamfer.

There is also the problem of the plane of the surface of the ring not staying perpendicular with the axis of the chamfer, this condition is more often harmful than helpful when one is installing a ring.

One is therefore faced with finding a solution which satisfies the requirements of a number of problems. First, one must have a solution which minimizes the entry diameter of a chamfer that is of an angle that is small enough to cause the ring to squeeze down with low applied force, given the mechanical squeeze properties of a ring that is "strong" enough for the retention required. Second, the solution must be in keeping with reasonable manufacturing requirements. Third, the thing which pushes the ring into engagement with the ring engaging groove must maintain sufficient perpendicularity to the chamfer and bore axis. Fourth, the cost of what is done must be low, or not too many will use the means, and so on. When one considers all that must be "satisfied" by a "workable" solution, it is not too surprising when one finds that ring installation is not done this way.

The method disclosed herein addresses these problems by providing a "pusher" that cooperates with provisions that are provided on the ring. The ring must squeeze to a smaller diameter to enter the bore, spring outward in diameter to "lock" into the groove, and if one desires to have the ring preassembled to the part that is "pushed-in", the ring must spring further outward from its free (as shipped) diameter so as to spring back to its free diameter after assembly to the part that the ring is pushed over. For ease of discussion the part that is pushed into the bore will be called the male, and the bore will be called the female.

Because of the springing that must be done by the ring, the outer periphery of the ring must be free to spring outward or inward. The inner portion of the ring must accommodate the male which will be retained by the ring, and the portion between the outer spring arms of the ring and the male must provide space for the outer ring arm compression, as well as any provision for maintaining ring concentricity to the male.

Any provisions made that maintain ring concentricity to the male are thus done in this intermediate area. The purpose of these provisions would be to maintain the concentricity of the ring to the male, so that one installing the male into the female could merely establish the concentricity of the male to the female, and the ring would be concentric with the chamfer leading to the female bore.

If one further had a portion of the male, that extends beyond the ring, enter a concentric bore in the female, then the concentricity of the ring and chamfer would be greatly facilitated.

OBJECTS OF THE INVENTION

It is a general object of the present invention to provide an internal retaining ring, which is to be assembled onto a part and which is assembled into a bore with a retaining ring retention groove, such that the ring and the part have provisions which establish and maintain a concentricity between the ring and the part.

It is another object of the present invention to provide a retaining ring as above described wherein the cooperating portion of the part may be a separate item which is assembled to the part.

Other objects and advantages of the present invention will become apparent from the following detailed description taken in conjunction with the accompanying drawing.

BRIEF DESCRIPTION OF THE DRAWINGS

FIG. 5 is a side elevational view of the male portion of the assembly shown in FIG. 1;

FIG. 6 is a transverse cross sectional view taken substantially along the line 6—6 of FIG. 5;

FIG. 7 is a side elevational view of the portion of the male member and associated retaining ring in accordance with an alternate embodiment of the present invention;

FIG. 8 is a disassembled view of the male member and associated retaining bead shown in FIG. 7.

Referring to the drawings, FIGS. 1-3 show side views of ring 10, which has an outer pair of spring arms 12, which are fitted with removal facilitating holes 14, and gap 16 which allows spring arms 12 to compress inward toward the center of ring 10.

Figure 3:
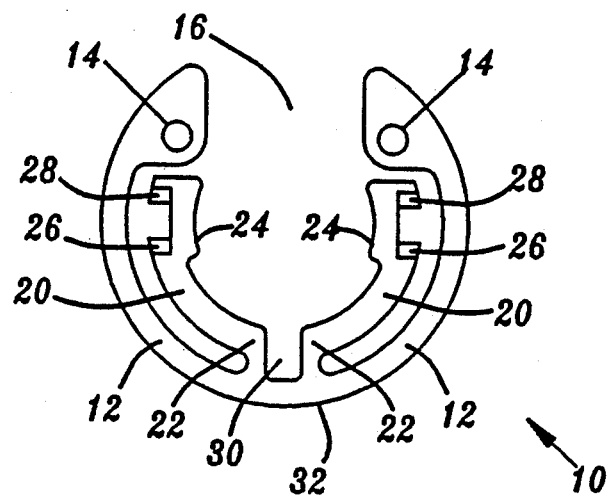
FIG. 3 is a top elevational view of the retaining ring embodied in the present invention.
Figure 4A:
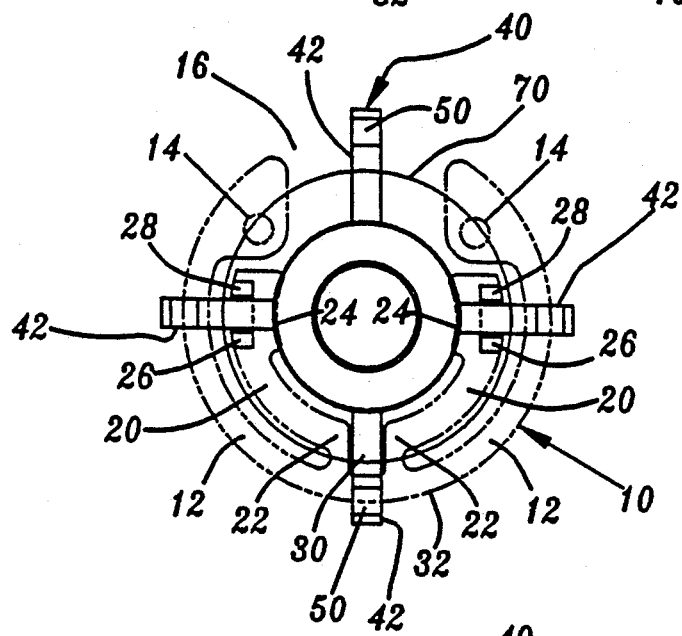
FIG. 4a is a bottom elevational view of the male portion of the assembly shown in FIG. 1.
Figure 4B:
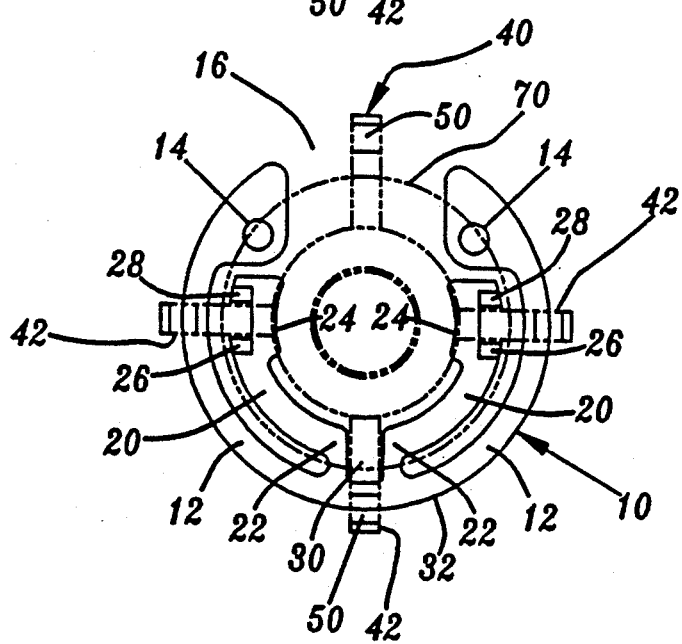
FIG. 4b is a top elevational view of the male portion of the assembly shown in FIG. 1.
Figure 9:
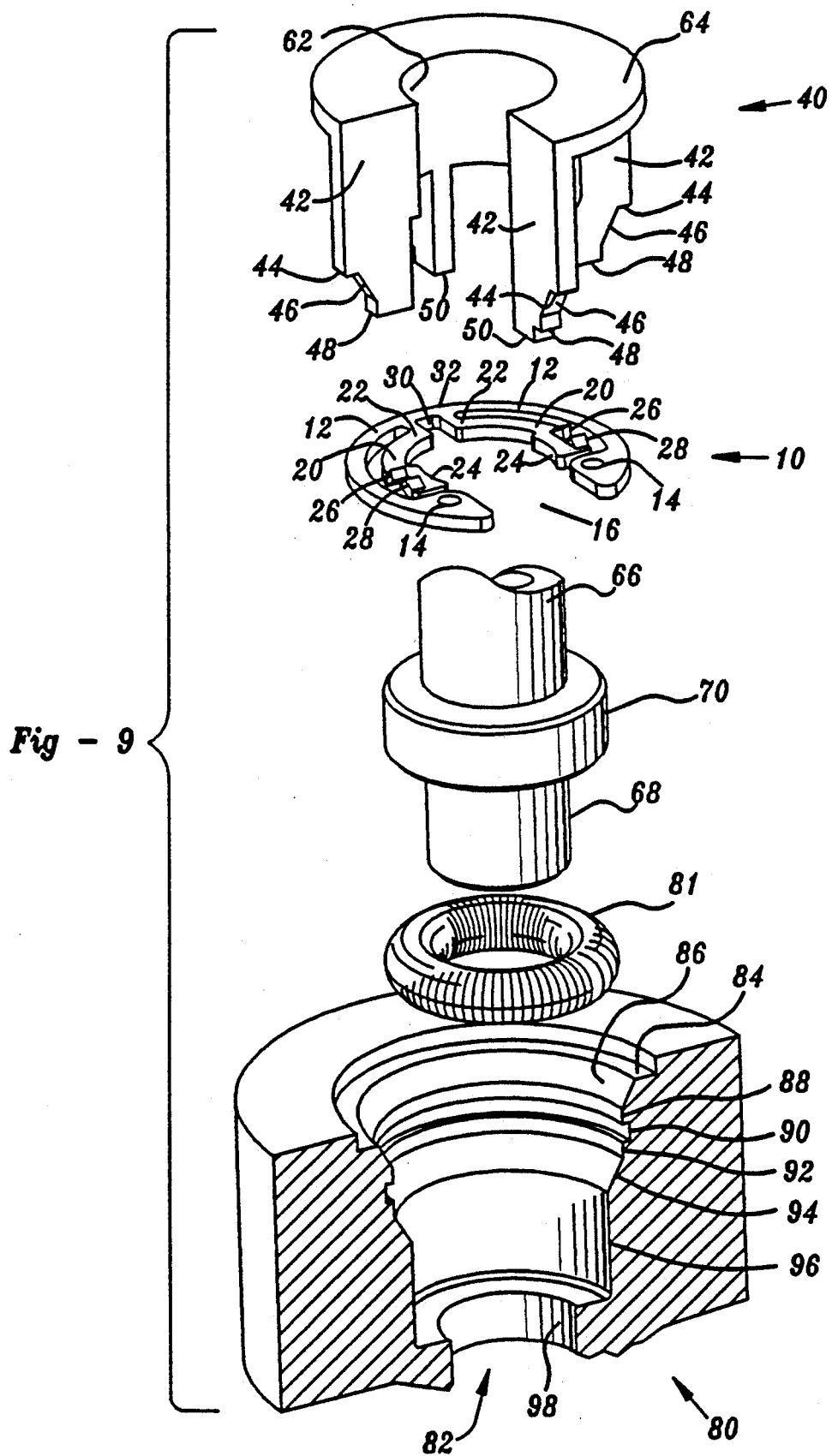
FIG. 9 is an exploded assembly view of the assembly of the retaining ring assembly of the present invention.

A second inner set of spring arms 20 are also a part of ring 10. Arms 20 are for the purpose of establishing and maintaining the concentricity of ring 10 to a male part (not shown in FIG. 3). Spring arms 20 emanate from an area 22 of spring 10. A space is left between the two attaching areas 22 which is used as a female key slot 30 to accommodate wider cooperating fins on the male part (not shown) which are used to assure the proper orientation of ring 10 on the male. Arms 20 also include area 24, which is to assure concentricity of ring 10 in a direction perpendicular to gap 16 and the aligning key slot 30, and areas 26 and 28 which are tabs that bent so as to cooperate with fin 42, as best seen in FIGS. 3, 6 and 7 and establish and maintain ring 10 concentricity in the direction between tabs 26 and 28. Area 32 which is the surface or part of the surface of the ring has had an additional material (like Teflon) added to facilitate the activity of installation. If it is desired to make a pressure confining fitting, seal (or seals) 81 may be added as shown.

Referring to FIGS. 4a, 4b, 5 and 6, four (4) fins 40 are shown in a relationship that will cooperate with ring 10. Fins 40 are not shown connected to a male part for clarity and because they may be joined together by a means (not shown) which may be attached to the male, which may be tubing with a bushing or ring portion attached to or formed on the tubing to provide an abutting wall for ring 10 to engage, so that ring 10 transmits the force that would separate the male from the female.

Various areas of fins 40 are shown, 42 is a fin (more than one (1) fin 42 is used), area 44 is a surface which can contact the outside of a counter sink (not shown) that is used prior to the surface (not shown) that the bore is put into, area 46 is shaped to accommodate any chamfer leading to the bore, area 48 engages the surface of ring 10, and area 50 fits into the gap 16 or slot 30 of ring 10. Area 52 is a surface that is not attached to the male if fins 40 are a part of a male. Fins 42 with surface 52 flex as ring 10 is installed.

Figure 2:
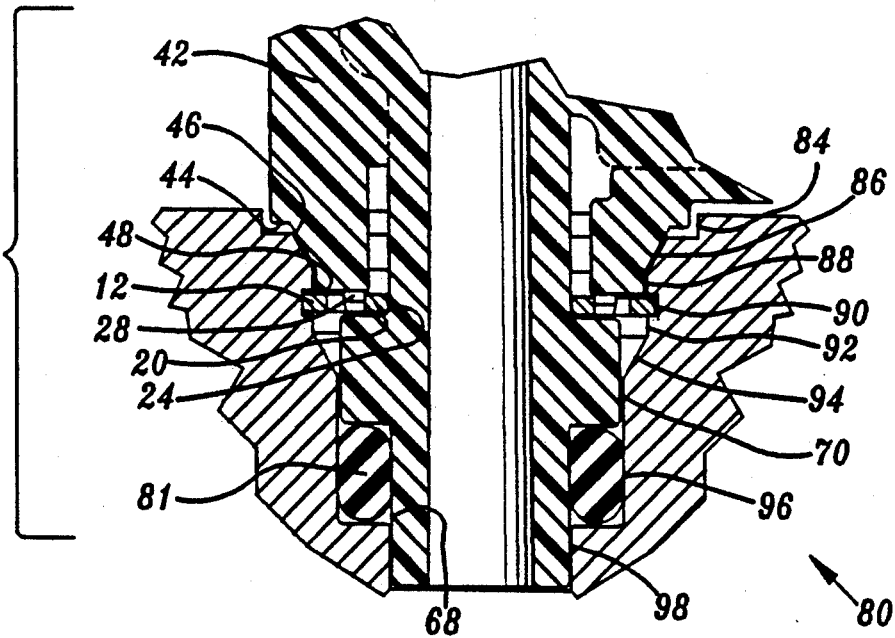
FIG. 2 is a view of the male and female portions of the assembly shown in FIG. 1, as depicted in a fully assembled configuration.

The purpose of fins 40 is to drive ring 10 into engagement with a groove (see FIG. 2) that is placed in a bore to retain ring 10. The surface 48 of fins 40 is dimensioned so as to drive ring 10 into an engaging position with the groove.

Referring to FIG. 5, an assembly of a male with an assembled on set of fins 40 and a ring 10 is designated 60. Tube 66, which may also be a part of a fitting to which a tube or hose might be connected, or any male portion, has attached to it, or part of it, that includes fins 42. If fins 42 are a separate part snapped over tube 66, then fins 42 are part of a body portion 62, which may also be provided with partial washer shaped portion 64 to facilitate pushing ring 10. Male or fitting 60 also has an expanded diameter portion 70 (or comprise a separate member added to the tube 66, as seen in FIGS. 6-8) which is a part of the male or assembled onto the male, and portion 68.

Both portions 68 and 70 are adapted to fit into the female bore (not shown), and ring 10 will abut a portion of expanded diameter 70 so as to transfer forces which would tend to separate male 60 from a female bore into which ring 10 engages a groove placed in the female bore (not shown).

Figure 1:
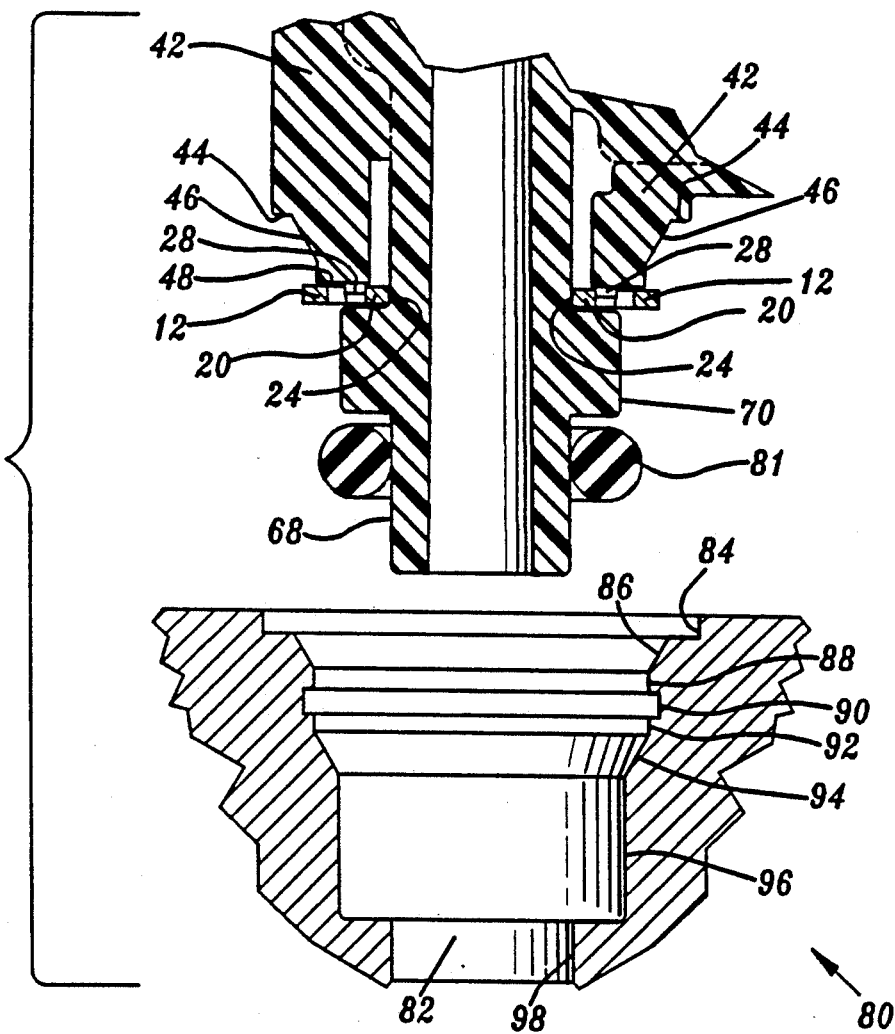
FIG. 1 is an exploded assembly view, partially in elevation, of the retaining ring assembly embodying the principles of the present invention.

Referring again to FIGS. 1 and 2, a cross section of a portion of a female 80 is shown. Female 80 contains bore 82 which may consist of spot face diameter and surface 84, chamfer or tapered hole lead surface 86, ring bore 88, ring groove 90, ring bore 92, tapered hole surface 94, leading to bore 96, and bore 98.

Male 60 having an o-ring sealing element or the like 81 may be assembled into female 80 by first inserting male 60 into female 80, and then pressing on surface 64 which causes ring 10 to be collapsed in outside diameter by tapered hole surface 86, and driven into bore 88. Ring 10 is further driven inward until ring 10 expands into groove 90. The male 60 is now installed in the female 80. To remove male 60 from female 80 it is necessary to collapse the diameter of ring 10 until ring 10 will pass through ring bore 88. This is facilitated by special pliers that fit into ring 10 holes 14 to allow the pliers (not shown) to collapse the diameter of ring 10. When the ring 10 is sufficiently collapsed in diameter male 60 may be removed from female 80.

Any of ring 10, male 60 or female 80 may be made all of or partly made from plastic or metal. If plastic is used, a nylon or polyester is an applicable material. If metal is used, brass, steel or aluminum are applicable materials.

A means of making an internal retaining ring so that the ring remains concentric with a male on which it is assembled, and a means of orienting the ring so as to cooperate with the means on the ring and male, so that the male may be pushed into a female, which secures the ring and prevents the disassembly of the male from the female has been shown.

Other means of ring-male cooperation are also possible. The patent is concerned with the fact that one may provide this cooperation to provide the pushing force on the ring that is required, and the concentricity of the ring to the male that is required, to facilitate the installation of the ring by having a chamfered lead to squeeze inward on the ring, so the ring will enter a bore that is smaller in diameter than the ring in its free unsqueezed state.

While it will be apparent that the preferred embodiments illustrated herein are well calculated to fulfill the objects above stated, it will be appreciated that the present invention is susceptible to modification, variation and change without departing from the scope of the present invention.

I claim:

1. A fastener assembly for securing a generally cylindrically shaped member within an associated support structure having an axial bore, said assembly including an annular retaining ring adapted to be secured to an outer diameter portion of the member and have an outer peripheral portion thereof adapted for engagement with an annular recessed portion formed in an inner wall of said bore of the support structure, said retaining ring comprising a pair of inner arm portions, a pair of outer arm portions, and connecting means for integrally connecting the arm portions together such that said inner and outer arm portions are concentrically arranged, said outer arm portions forming said outer peripheral portion and being removably receivable within said recessed portion of said bore of said support structure, and said inner arm portions defining a pair of radially deflectable free first ends which are engageable with the outer periphery of said member whereby to resist said member from being disassembled from said structure.

2. The assembly as set forth in claim 1 wherein said shaped member includes a radially outwardly extending shoulder and said free first ends are adapted to engage said shoulder.

3. The assembly as set forth in claim 1 wherein said retaining ring is fabricated of a spring steel material.

4. The assembly as set forth in claim 1 wherein said structure comprises said recessed portion of said bore being a radially outwardly extending recess formed therein adapted to removably receive said outer arm portions of said retaining ring.

5. The assembly as set forth in claim 1 wherein said outer arm portions comprise a generally C-shaped section having said outer peripheral portion and defining a pair of radially deflectable free second ends.

6. The assembly as set forth in claim 5 wherein the free ends of said inner and said outer arm portions are adapted to deflect independently of one another in a radial direction.

7. The assembly as set forth in claim 6 which includes means for moving said outer arm portions radially inwardly to permit said retaining ring to be inserted into said recessed portion in said support structure.

8. The assembly as set forth in claim 6 wherein said means for moving said outer arm portions radially inwardly comprises tool engaging areas on said outer arm portions.

9. The assembly as set forth in claim 6 wherein said bore in said support structure comprises a tapered entrance area adapted for engagement with said outer arm portions for effecting radial inward movement thereof and thereby piloting said retaining ring into said bore.

10. The assembly as set forth in claim 1 which includes means for applying an axially inwardly direct force to said retaining ring to assemble said cylindrically shaped member within said support structure.

11. The assembly as set forth in claim 10 wherein said means for applying said axially inwardly directed force comprises a fin-like element disposed axially outwardly along said cylindrically shaped member from said retaining ring.

12. The assembly as set forth in claim 11 wherein said fin-like element comprises a plurality of radially outwardly extending fin portions.

13. The assembly as set forth in claim 12 wherein said fin portions are formed integrally of said cylindrically shaped member.

14. The assembly as set forth in claim 12 wherein said fin portions are adapted to be detachably secured on said cylindrically shaped member.

15. The assembly as set forth in claim 12 wherein said retaining ring comprises means cooperable with said fin portions for mounting concentrically between said ring and said fin portions.

16. The assembly as set forth in claim 1 which includes sealing means for providing a pressure tight seal between said member and said structure.

17. The assembly as set forth in claim 16 wherein said sealing means comprises an o-ring sealing element disposed between an outer diameter portion of said member and said bore of said structure.

18. A retaining ring for securing a generally cylindrically shaped member within an axial bore of an associated support structure, said retaining ring being adapted for engagement within an annular groove formed in an inner wall of said bore and with said shaped member, said retaining ring comprising a generally C-shaped outer arm, defining a respective pair of free first ends, said outer arm being adapted to be driven axially into said bore whereby to undergo reduction and expansion in diameter and be removably engaged within said groove, a pair of inner arms having, respectively, a radially extending first end connected to said outer arm and a free second end, the free first ends being capable of expanding and contracting toward said respective free second ends, said free second ends of said inner arms being engageable with the outer periphery of said member whereby to resist said member from being disassembled from engagement with said support structure.

19. A retaining ring as set forth in claim 18 wherein said ring is comprised of a resilient material, the free second ends and free first ends are adapted to contract independently of one another in a radial direction.

20. In a push-to-assemble fluid coupling of the type including a tubular conduit adapted to convey fluid and formed to include an annular shoulder, a housing having an axial passage for receiving said conduit at a first end and providing a fluid path at a second end, an inner wall of said housing passage in said housing being provided with an annular groove, and retainer means for retaining the conduit in said housing, the improvement wherein said retainer means comprises a planar body having an inner arm to engage the outer periphery of said conduit and center the axis of said conduit relative to the axis of said passage, an outer arm to be received in said annular groove, and connecting means for connecting a portion of said inner arm to a portion of said outer arm whereby the inner arm is in concentric relation to said outer arm, and a cam surface formed in the wall of said passage adjacent to said annular groove, each said arm generally defining a C-shaped spring element that includes a pair of free ends separated by an angular gap whereby the respective pairs of free ends are free to flex generally radially inwardly and outwardly relative to the axis of said passage and independently of one another, axial insertion into the passage causing the outer arm of said retaining ring to engage said cam surface and reduce in diameter and spring outwardly when the outer arm reaches said groove, and the inner arm acting to retain and center the conduit in the housing, and reduction in diameter of the outer arm when the conduit is retained permits axial outward removal of the ring and conduit from the passage.

21. In a push to assemble fluid coupling, a tubular conduit having a mating end portion to convey fluid and defining a first annular groove, a first C-shaped arm having free ends and adapted to be received in said first annular groove whereby to engage said conduit, a housing having an axial passage for receiving axial insertion of said conduit at a first end and providing a fluid path at a second end, said housing provided with a second annular groove in an inner wall of said passage, a second C-shaped arm having free ends and adapted to be received in said second annular groove, means connecting said arms together such that said arms are generally in concentric relation to one another, and means associated with said passage and at a location inwardly of said first end for reducing the diameter of said second C-shaped arm during axial insertion of said conduit.

22. The invention as claimed in claim 21, further comprising a forward shoulder proximate the mating end portion and a rearward shoulder remote from the mating end portion each of said shoulders being axially separated whereby to define said first annular groove, said rearward shoulder being adapted to engage said first C-shaped arm during the axial insertion of said conduit.

23. The invention as claimed in claim 22, further comprising seal means for sealing the outer periphery of said conduit and said passage, said seal means comprising an annular seal disposed forwardly of said forward shoulder and adapted to be driven into said passage and be compressed against the wall of said passage and the outer periphery of said conduit.

24. In combination, a fluid fitting including an axial bore having an inlet thereto, an interior abutment shoulder and an annular groove in an inner wall of said bore between said shoulder and said inlet; a fluid conduit extending axially and having a forward end portion configured for axial insertion into said bore, said conduit including an annular retention shoulder having first and second faces facing into and away from said bore; seal means for sealing said passage between the abutment shoulder and the first face of said retention shoulder; and a retention ring for removably retaining the conduit in said bore, said ring including a flexible C-shaped outer arm having free ends which deflect radially inward to allow entrance into the bore and radially outward to releasably engage said annular groove, and a pair of inner arms, each said inner arm having a first end connected to the outer arm and a free second end, said second ends being radially deflectable and adapted to engage the fluid conduit at the forward end portion, and said free first and second ends being adapted to deflect independently of one another.

25. A method of completing a fluid tight connection between a forward end portion of a male member matingly inserted into an inlet of an axial bore of a female member whereby to deliver fluid at a first position spaced interiorly of the inlet, the male member having an annular shoulder defining oppositely facing first and second axial surfaces, the steps of the method including forming a cam surface proximate to the inlet and an annular groove in an inner wall forming said bore, engaging a pair of inner arms of a retention ring with the outer periphery of said male member adjacent to one of said faces and mounting a seal onto said forward end portion of said male member adjacent to the other of said faces, said ring including a resilient C-shaped outer arm, abutting the inner arms against said one of said faces of said shoulder, axially inserting said male member into said bore, said insertion causing the cam to compress the outer arm and bring the outer arm into registry with said groove and said seal to said first position, whereby the outer arm of said ring seats in the groove to retain the male member and the seal forms a fluid seal about said male member and between said bore.

* * * * *